P. J. CHURCHILL.
COFFEE MAKING APPARATUS.

No. 182,167. Patented Sept. 12, 1876.

Witnesses:
J. C. Hubbell
T. J. Roach

Inventor-
P. Jos. Churchill
By H. N. Jenkins
Attorney-

UNITED STATES PATENT OFFICE.

P. JOSEPH CHURCHILL, OF NEW ORLEANS, LOUISIANA.

IMPROVEMENT IN COFFEE-MAKING APPARATUS.

Specification forming part of Letters Patent No. 182,167, dated September 12, 1876; application filed May 23, 1876.

*To all whom it may concern:*

Be it known that I, P. JOSEPH CHURCHILL, a resident of the city of New Orleans and State of Louisiana, have invented a certain new and useful Improvement in Coffee-Making Apparatus; and I do hereby declare the following to be a full, clear, and correct description of the same, reference being had to the annexed drawing, making a part of this specification.

My invention relates to a simple and economical apparatus for obtaining from ground coffee a strong, clear, and healthful beverage. Its construction, operation, and merits will be readily understood by referring to the accompanying drawing, whereon—

Figure 1:
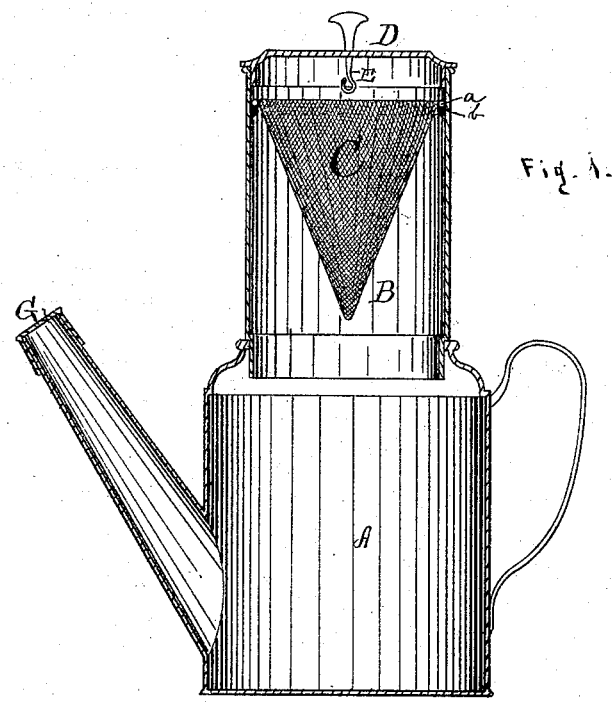
Figure 2:
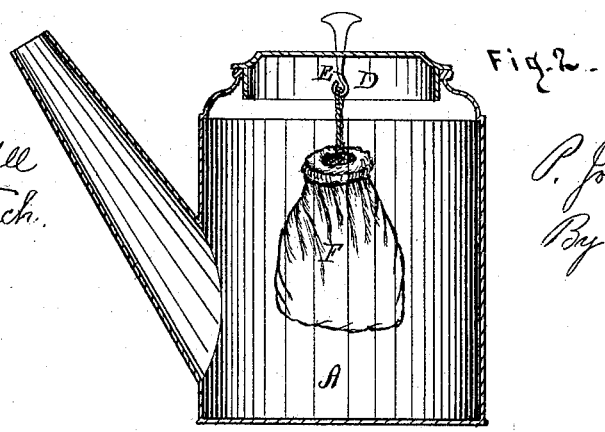

Figure 1 represents a vertical section of my apparatus, and Fig. 2 a vertical section of the lower part of same.

A is the lower, and B the upper, section. The latter is provided, in lieu of the ordinary perforated strainers, with a conical flannel drip-bag, C, the mouth of which is provided with a metallic ring, $a$, which not only serves to keep the bag open, but answers as a means by which the said bag may be suspended from the annular rest $b$ of the upper section B. The inside of the cover D, which answers for either the upper or lower section of the apparatus, is provided with a hook, E, from which is suspended at certain stages of the process a flannel bag, F.

The operation of my invention is as follows: The coffee, previously parched and ground, is placed in the conical bag C, and boiling water poured over the same, care being taken not to overflow the bag. The drippings are collected in the lower section A, in which the aroma is effectually confined by the cap S.

When it becomes necessary to prepare a second pot of coffee, the grounds are taken from the conical bag and placed, with a small addition of fresh coffee, in the bag F, which is suspended from the hook E of the cover D. The upper section B is then removed, and the lower section partially filled with clear water, in which the bag is next suspended, by applying the cover to the said lower section. The mouth of this bag should be held at sufficient height above the surface of the water to prevent any escape of the grounds. The apparatus is then placed over a fire, so that the boiling of the water may extract all the essence from the grounds.

Having described my invention, what I claim as new, and desire to secure by Letters Patent, is—

An apparatus for making coffee, consisting of the detachable sections A B, the latter provided with an annular rest, $b$, cover D having hook E, and bags C F, the whole constructed, combined, and arranged to operate substantially as described.

This specification signed this 22d day of February, 1876.

P. JOS. CHURCHILL.

Witnesses:
    H. N. JENKINS,
    F. J. ROACH.